United States Patent [19]

Andreae

[11] Patent Number: 5,051,118
[45] Date of Patent: Sep. 24, 1991

[54] METHOD OF FILTRATION

[76] Inventor: Robert Andreae, Le Vieux Motty, 1141 Yens, Switzerland

[21] Appl. No.: 455,505

[22] Filed: Dec. 15, 1989

[30] Foreign Application Priority Data

Apr. 26, 1989 [CH] Switzerland ............... 01584/89

[51] Int. Cl.$^5$ .................................. B01D 45/00
[52] U.S. Cl. ........................... 55/97; 55/445; 55/521
[58] Field of Search ............... 55/97, 442, 445, 446, 55/482, 486, 521

[56] References Cited

U.S. PATENT DOCUMENTS

| | | | |
|---|---|---|---|
| 3,075,337 | 1/1963 | Andreae | 55/446 |
| 3,225,526 | 12/1965 | Bayles et al. | 55/482 |
| 3,274,759 | 9/1966 | Bell, Jr. | 55/482 |
| 3,744,222 | 7/1973 | Delao | 55/446 |
| 4,008,060 | 2/1977 | Andreae | 55/446 |
| 4,589,983 | 5/1986 | Wydevan | 55/521 |
| 4,902,418 | 2/1990 | Ziegler | 55/521 |

Primary Examiner—Jay H. Woo
Assistant Examiner—C. Scott Bushey
Attorney, Agent, or Firm—Young & Thompson

[57] ABSTRACT

The invention relats to a method of filtration of a gaseous flow in which the flow is passed through at least one chamber the inlet and outlet openings of which are displaced to cause a turbulent flow projecting the particles of greater size against the walls of the chamber. At least one part of the gaseous flow is evacuated out of the chamber through a porous downstream wall which catches the finest particles. The filter has two walls (1,5) of different length connected the one to the other along every second fold (2,6). The downstream wall (5) is formed of a porous unwoven bed of fibres. The two walls (1,5) are provided with displaced openings (4,8).

3 Claims, 1 Drawing Sheet

METHOD OF FILTRATION

FIELD OF THE INVENTION

The present invention relates to a method of filtration intended to take out of a gaseous flow, generally air, the dry or wet particles in suspension in said gaseous flow.

BACKGROUND OF THE INVENTION

To purify such gaseous flows one generally proceeds either through a cyclonic filtration, i.e. one causes a turbulence in the flow which projects the suspended particles through centrifugal effect against the walls, or by screening, i.e. passage of the flow through a porous wall retaining the particles.

The filters now in use in this field have to be changed often and rapidly and the new standards require retention yields higher than 90% up to 99.5% and more. These filters are made by removable elements intended to be mounted in adapted frames.

THE KNOWN PRIOR ART

We now know of two types of filters working according to different principles.

In one type the filters of a bed, commonly planar comprise, of a porous material which retains the particles in suspension in the gaseous flow by a screening action. These filters have two major drawbacks; they do not retain the particles having a size smaller than their meshes or pores so that they have a low efficiency, or they introduce a too great pressure drop depending on their meshes or pores being of great or small dimensions, they clog very rapidly causing a rapid pressure drops increase, necessitating their frequent changing.

In the other type, the filters are of the pleated or accordion type having two or three walls made of impervious material, generally cardboard, these walls being connected along one out of two folds and having different dimensions so that chambers are created between the walls. These walls are provided with openings which are not aligned with each other; thereby creating a turbulent flow of the gas within the chambers of the filter causing through the centrifugal force applied to the particles, the projection against the walls of these chambers where they deposit. These "inertia" filters ensure a constant pressure drop over their life time but have the drawback not to retain the light particles, the mass of which is insufficient for the centrifugal force affecting them to project them against the walls. For certain types of paint, particularly laquers, these filters have a low efficiency (50 to 60% of retention) and can not satisfy the severe standards.

The aim of the present invention is a method of filtration tending to obviate the drawbacks of the precited existing filters and which enables simultaneously to reach a high efficiency, in a range comprised between 86% and 99.8% of retention according to the type of paint and the conditions of use, to avoid an important increase of the pressure loss with time and to have a relatively long life time, about the same as the existing accordion filters.

BRIEF SUMMARY OF THE INVENTION

The present invention has for its object a filtration method of a gaseous flow charged with paint particules or paint drops of different sizes, according to which this gaseous flow is passed through at least one chamber the inlet and outlet openings of which are displaced in order to cause a swirling flow projecting the particles of greater sizes by an inertia or centrifugal effect against the walls of the chamber and according to which a portion at least of said gaseous flow is evacuated outside said chamber through a downstream porous wall, catching thus the finest particles.

A filter for practicing the invention is constituted by an accordion type filter having two walls of different length connected along one fold out of two, that is along the upstream folds; in which at least the downstream wall is made of a porous unwoven fibers bed; and in which the two walls are provided with apertures, the apertures of the upstream wall being displaced with respect to those of the downstream wall thus creating the necessary conditions for a turbulent flow of the gas through the filter, particularly within the chambers located between the two walls.

BRIEF DESCRIPTION OF THE DRAWING

The attached drawing shows schematically and by way of example two embodiments of the filter according to the invention.

DETAILED DESCRIPTION OF THE INVENTION

The present method of filtration of a gaseous flow charged with particles in suspension, particularly of an air flow charged with paint particles or paint drops of different sizes comprises passing this gas flow through at least one chamber the inlet and outlet openings of which are displaced so as to cause a swirling flow projecting the particles of greater size through inertia or centrifugal force against the walls of the chamber and evacuating at least one portion of the gas flow from said chamber through a downstream porous wall, catching thus the finest particles.

The dimensions of the pores of this downstream wall are determined as a function of the finest particles in suspension so as to obtain a purification of the gas flow approaching 100%. This method, brings into effect simultaneously a cyclonic type filtration of the centrifugal or inertia type, and a screening type filtration which permits retention yields which have never been obtained thanks to an effect of synergy between the two filtration modes and this was not to be foreseen. Furthermore this method enables efficiently purifying a gas flow carrying particles having very different sizes, coarse and fine, which cannot always be achieved with a simple action filter. Finally as will be seen hereafter this filtration method can be carried out with a simple filter of which a maximum efficiency can be obtained, the two filtration modes being realized in different zones or areas of the filter.

Figure 1:
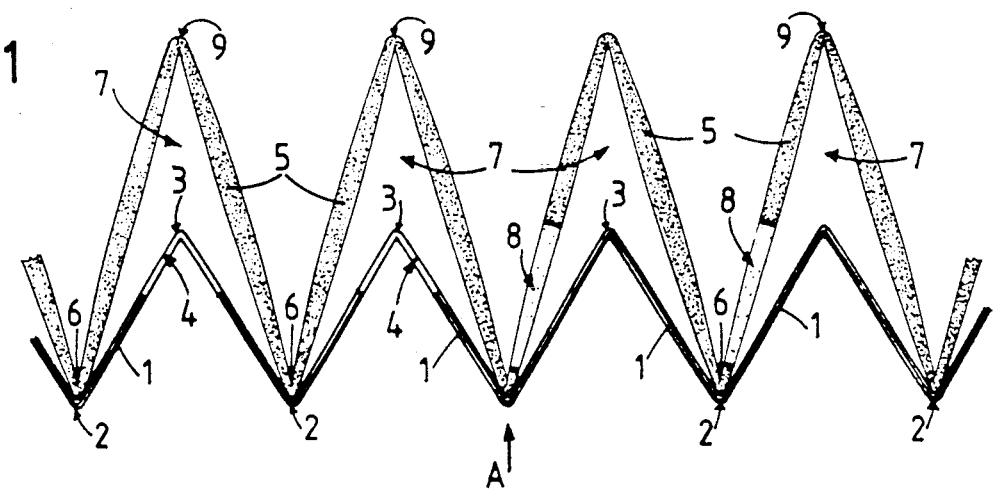
FIG. 1 is a cross section along line I—I of FIG. 2 of a first embodiment of the filter.
Figure 2:
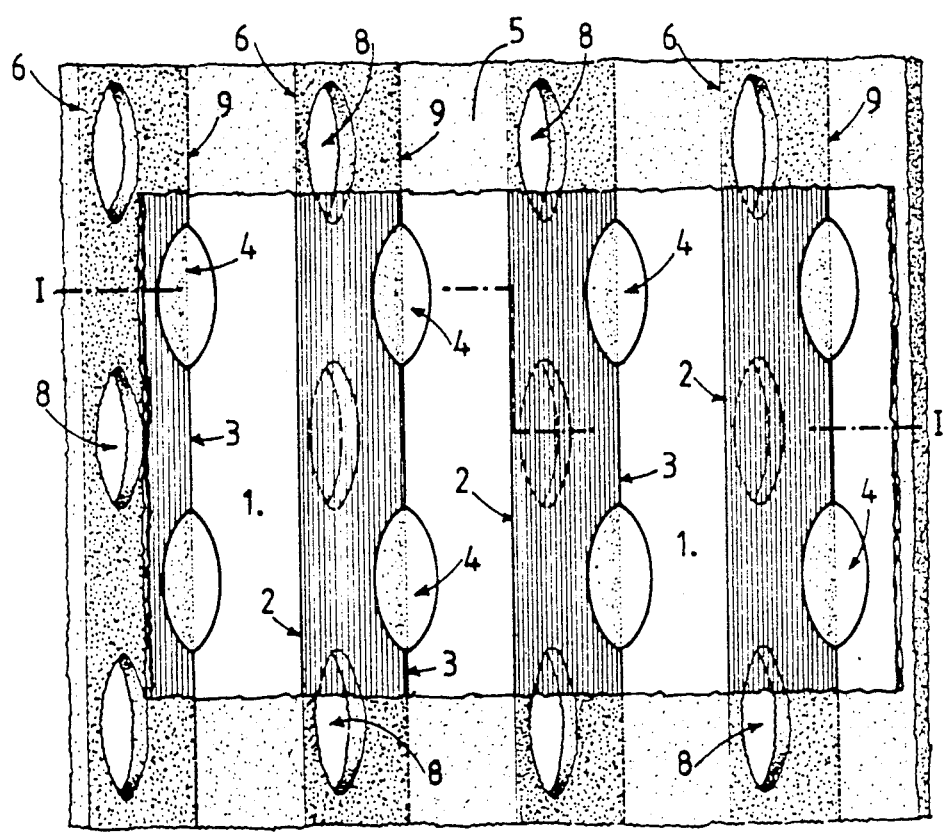
FIG. 2 is a partial view of the first embodiment of the filter certain parts of the upstream wall being broken away.

The first embodiment of the filter, shown in FIGS. 1 and 2, comprises a first wall, or upstream wall 1, of paper or cardboard provided with upstream folds 2 and down stream folds 3, the gaseous flow flowing along the direction of the arrow A. This upstream wall 1, which otherwise impervious, is provided with apertures 4 located in the example shown in rows and centered on the downstream folds 3 of the wall 1.

This filter comprises a second wall, or downstream wall 5 also folded in an accordion manner as the upstream wall 1 but the whole length of which, and thus also the length between two successive upstream folds 6, is greater than the corresponding length of the upstream wall 1. In this manner chambers 7 are created, which present in cross section the general shape of a V, between the two walls 1 and 5. In fact, the walls 1 and 5 are glued the one to the other along these upstream folds 2, 6. This downstream wall 5 is made of a bed or foil of unwoven synthetic fibres, for example polyester; it is therefore porous. The pores or voids of this wall 5 are of small dimension so as to retain the finest particles. Finally this second downstream wall 5 comprises apertures 8, displaced with respect to the apertures 4 of the upstream wall 1. In the example shown these apertures 8 of the second wall 5 are located in rows, located between the rows formed by the openings 4, and are provided near the upstream folds 6 of this second wall 5.

This new filter has an increased efficiency while having a normal life time and a normal pressure loss, i.e. of about the same order as the existing accordion type filters.

The increased efficiency of this filter is due to the fact that it combines two active principles which have a synergetic effect. On the one hand, the swirling created in the flow of gas through the filter projects the coarse particles against the lateral walls of the chambers 7 but simultaneously the fine particles of small mass, which undergo only to a small degree the swirling effect and cross the filter along a practically rectlinear pathway are caught by "screening" through the downstream wall 5 in the area of the folds 7 of this wall 5.

Experience has shown that the effect of the inertia type filtration, causing the projection of the particles in suspension in the gas flow against the lateral walls of the chambers 7, affects mostly the middle portions of these lateral walls and practically not the area near the downstream folds 9 of the second wall 5. These areas near the folds 9 work however principally according to the "screening" principle and retain the fine particles which are less or not affected at all by the turbulence of the gas flow.

It is this synergetic superimposition of the two filtration principles, filtration through inertia and through screening, which moreover that do not affect the same zones of the second wall 5 of the filter, which enables obtaining an unforseen effect; an efficiency greater that in the accordion type despite of the fact that one of its walls is porous which is usually a drawback of inertia filters.

This amazing result can be explained due to the experiments made with such filters as the fact that the two types of filtration which are simultaneously used do not affect the same portions of the second wall 5.

Therefore, the efficiency of the filter is reinforced, the fine particles can also be caught, while guaranteeing due to the openings 4, 8 a substantially constant pressure loss during whole of its working life. Thanks also to these openings 4, 8 the pores of the downstream wall 5 can be of very small dimensions, without increasing the pressure drop or limiting the working life of the filter, this permitting capturing the very fine particles with a filter having a small pressure loss only.

The synergy obtained through the combination of the inertia and screening type of filtration is a very strange result which could not be predicted and this explains why, while the accordion type filters have existed for several decades, it has never occurred to persons skilled in this art to replace the impervious downstream wall of such a filter by a porous downstream wall.

This new filter has a further advantage since it is possible to build it so that the downstream wall 5, made as a bed of non woven synthetic fibers, is somewhat larger than the front or upstream wall 1, particularly in height. So this surplus of compressible material forms a tight seal between the filter and the frame in which it is received. In the existing filters it is always necessary to provide for a special seal since the variations in dimensions of the cardboard as a function of the hygrometry do not permit the realization of a filter with sufficiently precise dimensions to be fitted without sealing in a frame.

Figure 3:
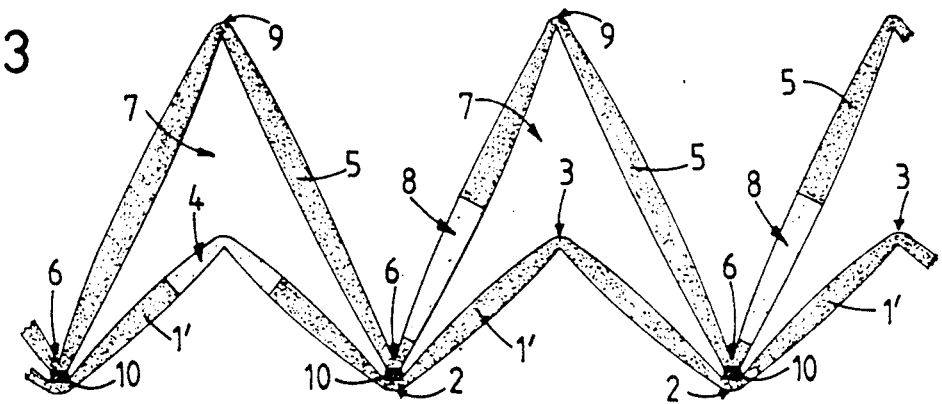
FIG. 3 is a cross section, similar to FIG. 1, of a second embodiment of the filter.

In the second embodiment shown in cross section in FIG. 3, the first wall or upstream wall 1' is also made of synthetic unwoven fibers, i.e. a porous material. The holes 4, 8 are located in the same way as in the first embodiment. In this embodiment the gluing of the upstream folds 2, 6 of the walls 1' and 5 is obtained by pressing these folds 2, 6 against an extruded rod 10 of synthetic material at the output of the extrusion die, i.e. when this rod is still at a temperature sufficiently high to melt and bond with the synthetic material, generally polyester, constituting the fibers of the unwoven beds of the wall 1' and 5. In fact in such a realization where the two walls are unwoven beds of polyester fibers, it is necessary to give the filter the necessary rigidity in the direction of its height through ribs, here the extruded synthetic material rods.

The operation of this filter is similar to that of the first embodiment described but for the fact that the first upstream wall being porous it serves also, in a first period of the filter life time at least, to retain by screening the fine and light particles.

I claim:

1. Filtration method of a gaseous flow charged with paint particles or paint drops of different sizes, comprising forcing said gaseous flow through an accordion type filter having two walls of different length connected along upstream folds defining chambers between them and having displaced inlet and outlet openings in order to cause a swirling flow projecting the particles of greater size by inertia or centrifugal effect against walls of the chambers, wherein the downstream wall of said filter is porous so that a portion at least of said gaseous flow is evacuated outside said chambers through said porous walls and not through the outlet openings, catching thus the finest particles.

2. Method as claimed in claim 1, in which the gaseous flow passes through said chambers which are located side by side and extending substantially perpendicularly to the gas flow, said chambers presenting in transverse cross-section the general shape of a V.

3. Method as claimed in claim 2, in which a part of the gaseous flow is forced into the chamber through upstream walls of the chambers which are also porous and not through the inlet openings.

* * * * *